Sept. 29, 1942. U. S. LAUBER 2,297,307
PROCESS FOR ROASTING ORE
Filed Oct. 28, 1940
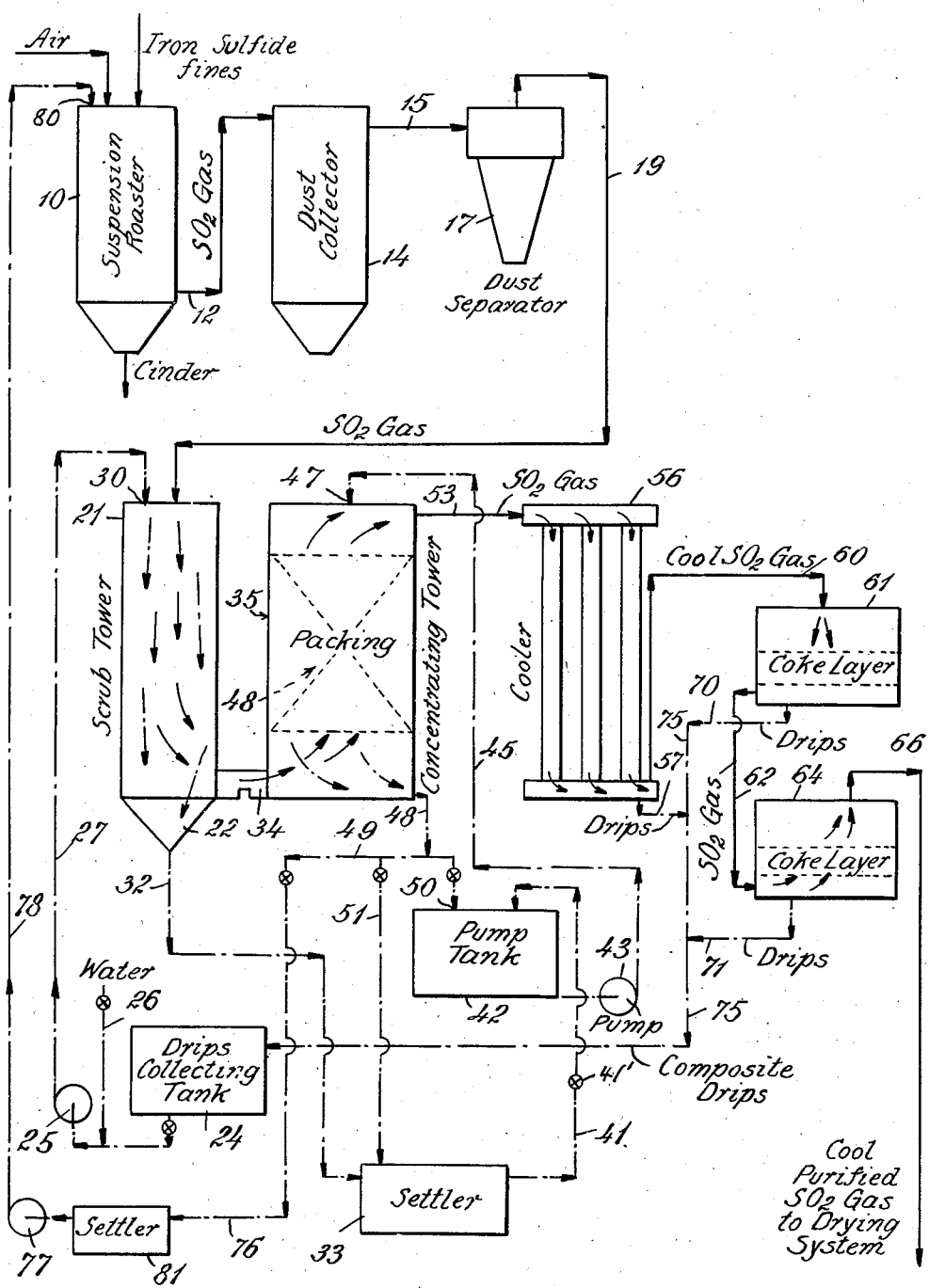
INVENTOR
Urban S. Lauber
BY Joseph A. Ryan
ATTORNEY Patented Sept. 29, 1942

2,297,307

UNITED STATES PATENT OFFICE 2,297,307

PROCESS FOR ROASTING ORE

Urban S. Lauber, Glen Rock, N. J., assignor to General Chemical Company, New York, N. Y., a corporation of New York Application October 28, 1940, Serial No. 363,137

7 Claims. (Cl. 23—178)

This invention relates to roasting of metal sulfide ore by suspension roasting methods particularly of the type described in Carter U. S. Patent 2,174,185 of September 26, 1939.

Much of the sulfur dioxide gas produced by roasting of metal sulfide ores such as pyrites is used in manufacture of sulfuric acid by the contact process. That portion of a contact sulfuric acid plant involved in practice of the present invention comprises the following apparatus units: an ore roaster for forming the raw $SO_2$ gas; hot purification apparatus such as dust chambers by means of which most of the solid particles entrained in the raw $SO_2$ gas are settled out; one or more so-called wet purification towers or chambers in which the gas stream is scrubbed with water or weak sulfuric acid to remove residual solids and other impurities and form a relatively cool gas stream of moderately low water-carrying capacity; coolers in which the gas stream is cooled ordinarily to temperatures of 100–150° F. to condense out water vapor and sulfuric acid vapors and mists; and filters such as coke boxes acting primarily to separate out of the gas stream sulfuric acid mist and impurities such as arsenic; all such apparatus units being associated together in the apparatus train in the order named. The condensate formed in the coolers following the wet scrub towers is largely water containing for example about 5% $H_2SO_4$, while the condensate draining out of the coke boxes is a similar aqueous liquid having $H_2SO_4$ concentration which may in some cases be as high as 20%. The liquid effluent of the wet scrub towers also contains sulfuric acid, the $H_2SO_4$ concentration depending upon the particular type of scrubbing operation used. In commercial roasting methods a small but appreciable portion of the $SO_2$ formed is unavoidably oxidized to $SO_3$ which in turn is converted during purification to sulfuric acid some of which constitutes the $H_2SO_4$ of scrub tower liquid effluent, of the condensates of the coolers following the wet scrub towers, and of the drips of coke-box filters. The total of such sulfuric acid may be termed "purification acid." Moreover, some portion of the $H_2SO_4$ formed during purification reacts with particles of oxides of metal such as iron, zinc, and lead in the gas stream and forms sulfates which, depending upon the $H_2SO_4$ strength of the liquors in the purification system, are carried in the liquors in solution or as sulfate crystal particles in suspension. In a typical operation, the overall plant $H_2SO_4$ production is diminished say 4 to 7% on account of $H_2SO_4$ and sulfate salt losses during purification.

In the earlier days of contact plant operation, multi-hearth furnaces were used for ore roasting but because of the slow, relatively quiescent nature of hearth roasting the dust problem created no special difficulty, and by means of one or two dust chambers it was possible to separate out of the roaster gas such a large proportion of the entrained dust that it was feasible to then wet-purify the gas in packed scrub towers without plugging up the packing with solids. In such a scrub tower the gas stream usually was flowed upwardly countercurrent to a stream of weak sulfuric acid which included the 15–20% $H_2SO_4$ drips from the coolers and coke boxes. Since hearth roaster gas on entering the scrubbing towers was not dust-laden to a degree resulting in choking up the packing, and since in a packed tower it is possible to appreciably concentrate the $H_2SO_4$ content of the scrubbing liquid, practice was such that the wet scrub towers were operated so that the sulfuric acid effluent of the scrub tower system had concentration of around 50° Bé., i. e., about 60% $H_2SO_4$. In this way purification acid was recovered but nevertheless in the form of a low strength, low-grade sulfuric acid for which there was and is very litle commercial demand. Further, at such $H_2SO_4$ strength most of the sulfate salts, predominantly iron, are precipitated out causing loss of $SO_4$ radical.

Following recent development of suspension roasting, hearth furnaces have been replaced by suspension or flash roasters. On account of the inherent characteristics of flash roasting, the dust problem became more acute because of the much greater quantities of dust carried in the $SO_2$ gas leaving the suspension roaster. The quantity of finely divided solids carried in a moderately high capacity suspension roaster gas is so great that, even after best practicable hot purification, e. g. by using a series of well-designed dust separators, it is not commercially feasible to use packed scrub towers for wet purification because the tower packing rapidly becomes clogged by solids carried into the wet purification phase as dust in the $SO_2$ gas. Hence it became advisable to use unobstructed scrub towers and since, in systems of the type described herein, any appreciable degree of $H_2SO_4$ concentration in an open tower is not feasible, the former practice of introducing into the top of the wet purification towers the weak acid drip from the coolers and coke boxes was more or less abandoned, and water used as the scrubbing liquid. Thus, in hearth roaster practice purification system acid was recovered only as an impure weak e. g. 60% acid of little market demand, while when using suspension roasting prior to development of this invention, the strength of the purification acid was so low as to be of no practical value.

The principal object of this invention is to provide a method by practice of which it is possible not only to recover purification system $H_2SO_4$ and the $SO_4$ of associated sulfate salts but to effect such recovery in the form of plant strength sulfuric acid.

The nature of the invention will be understood from the following description taken in connection with the accompanying drawing showing diagrammatically apparatus which may be used. On the drawing, solid lines designate gas passage thru the several apparatus units and dot-and-dash lines the course of flow of liquids thru the system.

Referring to the drawing, 10 indicates a metal sulfide fines suspension roaster which may be constructed and, as will hereafter appear, is operated in accordance with the principles described in Carter U. S. Patent 2,174,185. The hot sulfur dioxide gas produced, at temperatures of e. g. 1650–1900° F. and having $SO_2$ concentration of say 10–15%, passes successively thru line 12, preliminary gas cooler and dust collector 14, line 15, cyclone dust collector 17, into line 19. In such apparatus, the gas is ordinarily cooled down to around 1000° F. As known in the art, a waste heat boiler may be substituted for collector 17, in which case the temperature of the exit gas of the boiler may be considerably lower, e. g. 600–700° F. In any case, practically all of the heavier and most of the fine entrained solids are separated out of the gas stream. However, the proportion of such fine solids in the suspension roaster gas is so great that even after the best feasible dry separation of dust the gas stream such as in line 19 still contains a substantial amount of dust referred to herein as residual solids. To illustrate, such a gas may carry 0.1 to 1.0 gram per cubic foot (NTP) of dust, and prior to present improvements it was feasible to wet-purify such a gas only by the procedure previously described and involving practically a total loss of so-called purification acid and the $SO_4$ of the contained sulfate salts. I have found a method by means of which such a gas may be wet-purified to the degree desired and in such a way that all of the free $H_2SO_4$ and sulfate radical of sulfate salts formed during the roasting and purification operations may be recovered as plant strength sulfuric acid. Briefly stated, a preferred embodiment of the present invention comprises contacting the gas stream, such as in line 19 and after dry separation therefrom of the bulk of entrained solids, in an unobstructed scrubbing tower with liquid in quantity and under conditions to cause separation from the gas stream of the major portion of the residual entrained solids, then contacting the thus partially scrubbed gas stream in a packed concentrating tower with a sulfuric acid solution, regulating the contacting operation in the packed tower so as to increase the $H_2SO_4$ strength of the solution, effect substantially complete removal of residual solids from the gas and so that the sulfuric acid liquor discharged from the packed tower is of concentration not less than 30 and not more than 41° Bé., then introducing at least a portion of the concentrating tower effluent into preferably a metal sulfide fines suspension roasting zone and effecting decomposition of such portion to form $SO_2$ by means of heat liberated in the suspension roasting operation as in accordance with the teachings of the Carter patent.

In the following description of the invention specific gas volumes, gas temperatures, dust contents and liquor concentrations mentioned are to be considered, except where otherwise indicated, as illustrative.

In the practice of the invention in a plant designed to handle say 4000 cubic feet per minute (NTP) of $SO_2$ gas, such gas at temperature of about 1000° F. and carrying about 0.1 gram per cubic foot (NTP) of dust is charged into the top of an unobstructed scrub tower 21 which may be say twenty feet high and six feet in diameter and which is provided with a cone bottom 22 for liquor collection. Weak sulfuric acid solution of $H_2SO_4$ strength of say 10–20% (the source of such solution being hereafter described) is withdrawn from collecting tank 24 by pump 25 and fed into line 27 terminating in one or more spray heads 30 designed to shower liquor over the cross-section of tower 21. Liquor leaving tower 21 runs thru connection 32 into settler 33. The arrangement shown provides for passage thru tower 21 of a relatively large volume of liquor which may be fed in at temperature of 75 to 150° F. and leaves thru pipe 32 at temperature of about 175–225° F.

In tower 21 the hot $SO_2$ gas is intimately contacted with scrubbing liquor. The chief functions of tower 21 are (1) to separate from the gas stream at least the major part and preferably 60% or more of the residual solids contained in the $SO_2$ gas in line 19, and (2) to substantially cool the gas stream. Volume of the scrubbing liquor and temperature of the same entering top of tower 21 are variable and depend upon factors such as the size of the installation, volume of gas passing thru the system, solid material content of the $SO_2$ gas in line 19, and also upon the particular gas stream temperature desired as the gas passes thru connection 34 and into the bottom of concentrating tower 35. In tower 35, sulfuric acid in the circulating liquor is concentrated, and in order to effect appreciable $H_2SO_4$ concentration, the gas entering tower 35 should contain appreciable amount of heat and temperature should be preferably not less than 200–275° F. Accordingly, taking into consideration the variables mentioned, and the primarily important feature of removing at least a major portion of solids from the gas stream in tower 21, and the secondary feature of cooling the gas to temperature not below that needed for appreciable acid concentration in tower 35, rate of feed of scrubbing liquid into tower 21 may be regulated by the operator in accordance with the particular conditions encountered. In the example under consideration, the gas was discharged from the tower thru connection 34 at a temperature of about 250° F. The scrubbing acid at about 10% $H_2SO_4$ strength entered thru spray 30 at temperature of about 100° F. and was discharged thru pipe 32 at temperature of about 225° F. at concentration of about 16° Bé. and had an $H_2SO_4$ concentration of about 12%. Liquid passage over the tower was about six gallons per minute and about 60% of the dust in the incoming $SO_2$ gas was extracted by scrubbing liquid. In other test runs as much as 85% of the dust has been separated from the gas in tower 21.

Operation of the wet purification system of this invention, that is operation of scrubbing tower 21 and subsequent concentrating tower 35, is such that practically all of the metal sulfates are kept in solution so that the $SO_4$ radical of such sulfates may be converted to $SO_2$ and ultimately recovered as plant strength sulfuric acid. This result is effected, as subsequently discussed, by maintaining concentration of the liquors in the purification system not in excess of 41° Bé., settled basis. In this specification and appended claims, mention of liquor concentration in terms of degrees Baumé is intended to indicate liquor concentration after settling of substantially all solids normally suspended in the liquor. In operation as described, concentration of the liquor effluent of tower 21 does not normally exceed about 20° Bé., and should not be permitted to exceed 38° Bé. Any desirable concentration reduction may be effected by introduction of water from pipe 26. Minimum concentration of the liquor effluent is not critical.

The liquor run-off of tower 21 comprises the $H_2SO_4$ initially present in the solution fed in at spray 30 plus $H_2SO_4$ picked up during passage thru the tower, such latter $H_2SO_4$ having been formed from $SO_3$ present in the $SO_2$ gas stream. Sulfuric acid concentration of the tower liquor effluent does not exceed about 15% $H_2SO_4$. The liquor contains solids and also sulfates of metals such as iron, zinc and lead, substantially all of which sulfates are held in solution under the conditions indicated. The liquor runs thru pipe 32 into settler 33 which is large enough to facilitate deposition and settling out of practically all solids comprising mostly iron oxide, together with some silica.

Relatively clear sulfuric acid solution overflow of the settler, having $H_2SO_4$ strength normally of 15% or less, is run thru pipe 41, controlled by valve 41', into pump tank 42 at a rate controlled so that the composite liquor withdrawn therefrom by pump 43 has a concentration of say 35-38° Bé., preferably as high as feasible taking into consideration the degree of increase of concentration during the succeeding pass of liquor over tower 35. Such liquor is run thru line 45 to a spray head 47 in the top of concentrating tower 35. Temperature of the liquor as fed into tower 35 may be 150 to 200° F. The tower, the size of which in comparison with tower 21 is approximately as indicated in the drawing, is of relatively large diameter and is filled as shown on the drawing with suitable packing 48 which effects relatively prolonged contact of gas with the liquid running down thru the packing. Part of the tower effluent liquor, usually at temperature of 175 to 200° F., is returned thru pipe 48, header 49, and valve-controlled outlet 50 to tank 42. Control of liquor circulation thru tower 35 is such that the concentration of the liquor in pipe 48 and header 49 is not less than 30° and not more than 41° Bé. Ordinarily such concentration would be around 35-37° Bé. and rarely more than 38° Bé.

Gas entering the bottom of tower 35 passes upwardly thru packing 48 against a downflow of relatively thin films of sulfuric acid liquor distributed over the top of the packing. The gas is cooled and leaves the tower thru conduit 53 at temperatures of 150 to 250° F. Water is evaporated and $H_2SO_4$ strength of the liquor is increased say 1 or 2% during one pass over the tower. Substantially all remaining solid impurities are scrubbed out of the gas and picked up by the downflowing liquor. On account of increase in $H_2SO_4$ strength of the liquid phase of the liquor and entrainment of the solids scrubbed out of the gas, the concentration of the liquor during one pass thru the tower increases say 1 to 2 degrees Bé. The liquid phase of the liquid in tank 42 may have an $H_2SO_4$ strength varying from say 20 to 30%, and although the amount of solids in the gas entering tower 35 is relatively small, the tower effluent liquor may contain 0.1 to 0.2% by weight of solids. In cases where solid matter extraction in tower 35 is relatively high, part of the tower effluent liquor may be by-passed continuously or intermittently thru pipe 51 around the pump tank 42 and into the settler 33.

I have found that, when the $SO_2$ gas has been treated as previously described, i. e. to scrub out at least the major portion of residual solids contained in the gas stream on entering the wet purification system (e. g. tower 21), and where the concentration of the effluent liquor of the tower 35 is kept within the 31–41° Bé. range, it is possible to remove from the gas the balance of the residual solids, effect an appreciable concentration of sulfuric acid, and further to keep in solution the sulfate salts of metals such as iron (ferric and ferrous), zinc and lead, and at the same time avoid clogging of packing by solids. Further, I have discovered that in the case of a liquor of the kind described, the physical and chemical characteristics and properties are such that the liquor may be treated in a suspension roaster, as hereafter indicated, to convert the sulfur values of the liquor to $SO_2$. Moreover, I have observed that when concentration of the tower effluent is permitted to exceed 41° Bé., precipitation of sulfate salts takes place to such an extent as to risk plugging the tower or in any case precipitate sulfates and cause loss of $SO_4$ radicals of the same. On the other hand, the concentration of the tower effluent should not be permitted to fall below 30° Bé. since the product then is not readily adaptable for handling in the suspension roaster. A secondary factor in operation of tower 35 is control of scrubbing liquor flow so that temperature of the gas leaving the tower is not more than 300° F. and preferably less than 200° F., this latter feature being for the purpose of effecting such cooling of the gas as to utilize heat in the tower for acid concentration and to reduce water carrying capacity of the gas.

In the example under consideration, the $SO_2$ gas entered tower 35 at temperature of 250° F. and was discharged at 175° F. Liquor was fed into the top of the tower at concentration of about 38° Bé. and temperature of 150° F., and the effluent liquor concentration was 40° Bé. and temperature 175° F. Liquor was circulated over the tower at rate of about 35 gallons per minute.

The $SO_2$ gas then passes downwardly thru tubular cooler 56 the function of which is to cool the gas stream down close to 100° F. so as to condense a large portion of the entrained water vapor and a substantial amount of sulfuric acid mist. The condensate leaving cooler 56 thru pipe 57 may have an $H_2SO_4$ concentration of 2 to 5%. The exit gas of the cooler contains substantial quantities of acid mist and to effect removal of the same, the gas stream is passed successively thru pipe 60, coke filter 61, line 62, and coke filter 64. Gas leaving coke box 64 thru pipe 66 is an $SO_2$-oxygen-nitrogen gas containing some water vapor. Where the sulfur dioxide is to be used in the contact sulfuric acid plant the gas is then flowed thru pipe 66 to the usual drying system.

In filters 61 and 64 substantial amounts of acid mist are filtered out of the gas stream and drain thru outlets 70 and 71 into pipe 75 by means of which the drips of cooler 56 and of both coke filters are transferred to the collecting tank 24. The coke-box drips ordinarily run around 20% $H_2SO_4$, and the composite condensate in pipe 75 may have $H_2SO_4$ concentration of 10–15%, temperature ordinarily being 75–100° F. The greater part of the wet purification acid is recovered as condensate such as in pipe 75, the balance being present in the effluent liquids of towers 21 and 35.

From the foregoing description it will be seen that all of the purification system acid—whether from tower 21, tower 35, cooler 35 or filters 61 and 64—finally collects in header 49 as a sulfuric acid containing liquor having a concentration of 30–41° Bé. Further, on account of the above described operation control, practically all of the sulfates of metals, such as iron, zinc and often lead, formed during purification are present in the liquor as soluble sulfates. Following is the analysis, after settling, of a respresentative liquor recovered in header 49.

| | | |
|---|---|---|
| Strength at 60° F. | °Bé | 37.86 |
| Free acid $H_2SO_4$ | Per cent | 32.03 |
| Total sulfates as $SO_4$ | do | 35.84 |
| Ferrous sulfate | do | 1.61 |
| Ferric sulfate | do | 1.68 |
| Total iron as Fe | do | 1.06 |
| Zinc sulfate | do | 4.40 |
| Arsenic as As | do | .13 |
| Total solids after ignition | do | 5.57 |

Part of the liquor effluent of tower 35, a quantity corresponding with the so-called acid make, is run from header 49 thru pipe 76 to the suction side of pump 77 thence thru line 78 to one or more suitable spray nozzles 80 located for example in the top of suspension roaster 10. Preferably, the liquor is passed thru settler 81 to remove any solids present to lessen abrasion of the spray nozzles 80. A suspension roasting operation generates substantially greater quantities of heat than is needed to maintain the oxidation reaction self-sustaining. In accordance with the present invention, the acid make of tower 35 is sprayed into the suspension roaster thru one or more suitably constructed and arranged nozzles, and by action of the high temperatures prevailing, e. g. 1600–1950° F., the liquor is completely decomposed with respect to the liquor thus fed into the suspension roaster, the reactions taking place are briefly as follows: water is vaporized; free $H_2SO_4$ is decomposed to water vapor, oxygen, and $SO_2$; and metal sulfates, especially ferrous sulfate, are decomposed to form metal oxide cinder (e. g. $Fe_3O_4$), $SO_2$ and $SO_3$, the latter being immediately dissociated to $SO_2$ on account of the high temperatures of suspension roasting. These principles are all more fully discussed in Carter U. S. Patent 2,174,185 to which reference is hereby made for detailed procedure as to how to operate a suspension roaster in such a way as to make use of excess heat for the decomposition of other materials to form sulfur dioxide and metal oxide cinder. Similar recovery of the sulfur values of the purification system liquors may be had by spraying the liquor into the preliminary gas cooler 14. However, it is preferable to decompose the purification acid in the burner proper to make most efficient use of the available heat and avoid loss of heat which might otherwise be dissipated as radiated heat.

The suspension roaster shown in the Carter patent operates on the so-called co-current principle, that is the material to be roasted and the oxidizing gas passing thru the combustion zone in the same direction. Freeman U. S. Patent 2,030,627 of February 11, 1936, discloses a countercurrent suspension roasting method, and Mullen U. S. Patent 2,070,236 of February 9, 1937, describes a third type of operation. As far as practice of this invention is concerned, it is not important which type of suspension roasting is used. Acid make of tower 35 may be decomposed in conjunction with the Freeman or Mullen or any similar suspension roasting method. Regardless of the physical nature of the suspension roasting operation—whether co-current as in the Carter patent or countercurrent as in the Freeman patent or otherwise—it will be understood that the roasting operation, as far as the decomposition of the acid make of tower 35 is concerned, is carried out in accordance with the teachings of the Carter patent. All that is needed to carry out the last phase of the process of this invention is the provision on known suspension burners of a suitable number of liquor injection nozzles preferably located immediately adjacent the known sulfide fines feed mechanism.

In the operation of a plant such as described, it is noted that in summer ordinarily more water vapor goes into the drying apparatus thru pipe 66 than enters the system as moisture in the air and sulfide fines fed into burner 10. Hence, any water loss may be balanced by water introduced thru pipe 26. In winter, usually less water passes to the drying unit than enters the burner with the air and ore. Thus, should water accumulate to an undesirable degree in the system shown on the drawing, some of the liquor may be bled out at any convenient point. Generally, however, it may be considered that the water content of the liquors circulates continuously thru the burner and puification units.

The $SO_2$ formed in the suspension roaster by decomposition of the $H_2SO_4$ and metal sulfates of the overflow of tank 42 mingles with the $SO_2$ gas produced by burning of the sulfide fines, and all of the sulfur values in the system eventually pass thru pipe 66 as $SO_2$ for conversion in the contact plant, not shown, to commercial strength sulfuric acid.

I claim:

1. In the production and purification of $SO_2$ gas by an operation involving oxidation of metal sulfide fines in a suspension roasting zone with formation of metal oxide cinder and a hot $SO_2$ gas stream carrying entrained solids, separation from the gas stream in the dry way of the bulk of entrained solids, and subjection of the gas to wet purification to effect separation of residual solids and other impurities, the improvement comprising contacting the gas stream, after dry separation therefrom of the bulk of entrained solids, in an unobstructed scrubbing chamber with liquid in quantity and under conditions to cause separation from the gas stream of the major portion of said residual solids entrained in the gas stream entering said scrubbing chamber, contacting the gas stream in a packed concentrating chamber with a sulfuric acid solution, regulating the contacting operation in said packed chamber so as to increase $H_2SO_4$ strength of said solution, to effect substantially complete removal of residual solids from the gas and so that the sulfuric acid containing liquid effluent of said packed chamber has concentration not less than 30 and not more than 41° Bé., introducing at least a portion of said liquid effluent into said suspension roasting zone, and dissociating said portion to form SO₂ by means of heat liberated on suspension roasting of further quantities of metal sulfide fines.

2. In the production and purification of SO₂ gas by an operation involving oxidation of metal sulfide fines in a suspension roasting zone with formation of metal oxide cinder and a hot SO₂ gas stream carrying entrained solids, separation from the gas stream in the dry way of the bulk of entrained solids, and subjection of the gas to wet purification to effect separation of residual solids and other impurities, the improvement comprising contacting the gas stream, after dry separation therefrom of the bulk of entrained solids, in an unobstructed scrubbing chamber with liquid in quantity and under conditions to cause separation from the gas stream of the major portion of said residual solids entrained in the gas stream entering said scrubbing chamber, contacting the gas stream in a packed concentrating chamber with a countercurrent flow of a sulfuric acid solution, regulating flow of liquid and gas in said packed chamber so as to increase H₂SO₄ strength of said solution, to effect substantially complete removal of residual solids from the gas, to cool gaseous effluent of such chamber to not more than 300° F., and so that the sulfuric acid containing liquid effluent of said packed chamber has concentration not less than 30 and not more than 41° Bé., introducing at least a portion of said liquid effluent into said suspension roasting zone, and dissociating said portion to form SO₂ by means of heat liberated on suspension roasting of further quantities of metal sulfide fines.

3. In the production and purification of SO₂ gas by an operation involving oxidation of metal sulfide fines in a suspension roasting zone with formation of metal oxide cinder and a hot SO₂ gas stream carrying entrained solids, separation from the gas stream in the dry way of the bulk of entrained solids, and subjection of the gas to wet purification to effect separation of residual solids and other impurities, the improvement comprising contacting the gas stream, after dry separation therefrom of the bulk of entrained solids, in an unobstructed scrubbing chamber with sulfuric acid solution in quantity and under conditions to cause separation from the gas stream of the major portion of said residual solids entrained in the gas stream entering said scrubbing chamber, contacting the gas stream in a packed concentrating chamber with a sulfuric acid solution, regulating the contacting operation in said packed chamber so as to cool gaseous effluent thereof to not more than 300° F. and so that the sulfuric acid containing liquid effluent of said packed chamber has concentration not less than 30 and not more than 41° Bé., further cooling the gas stream to condense sulfuric acid vapor and mist, passing the resulting condensate first thru the scrubbing chamber and then, after separation of solids, thru the concentrating chamber, introducing at least a portion of the liquid effluent of the concentrating chamber into said suspension roasting zone, and dissociating said portion to form SO₂ by means of heat liberated on suspension roasting of further quantities of metal sulfide fines.

4. In the production and purification of SO₂ gas by an operation involving oxidation of metal sulfide fines in a suspension roasting zone with formation of metal oxide cinder and a hot SO₂ gas stream carrying entrained solids, separation from the gas stream in the dry way of the bulk of entrained solids, and subjection of the gas to wet purification to effect separation of residual solids and other impurities, the improvement comprising contacting the gas stream, after dry separation therefrom of the bulk of entrained solids, in an unobstructed scrubbing chamber with liquid in quantity and under conditions to cause separation from the gas stream of the major portion of said residual solids entrained in the gas stream entering said scrubbing chamber, contacting the gas stream in a packed concentrating chamber with a sulfuric acid solution, regulating the contacting operation in said packed chamber so as to increase H₂SO₄ strength of said solution, to effect substantially complete removal of residual solids from the gas and so that the sulfuric acid containing liquid effluent of said packed chamber has concentration not less than 30 and not more than 41° Bé., and then dissociating at least a portion of said liquid effluent by means of heat liberated on suspension roasting of further quantities of metal sulfide fines to thereby recover, as SO₂, sulfur values contained in said portion.

5. In the production and purification of SO₂ gas by an operation involving oxidation of metal sulfide fines in a suspension roasting zone with formation of metal oxide cinder and a hot SO₂ gas stream carrying entrained solids, separation from the gas stream in the dry way of the bulk of entrained solids, and subjection of the gas to wet purification to effect separation of residual solids and other impurities, the improvement comprising treating the gas stream, after dry separation therefrom of the bulk of entrained solids, to effect separation from the gas stream of the major portion of said residual entrained solids, contacting the resulting gas stream in a packed concentrating chamber with a sulfuric acid solution, regulating the contacting operation so as to increase H₂SO₄ strength of said solution and so that the liquid effluent of such contacting operation has an H₂SO₄ concentration not in excess of that causing precipitation of contained metal sulfate, and then dissociating at least a portion of said liquid effluent by means of heat liberated on suspension roasting of further quantities of metal sulfide fines to thereby recover, as SO₂, sulfur values contained in said portion.

6. In the production and purification of SO₂ gas by an operation involving oxidation of metal sulfide fines in a suspension roasting zone with formation of metal oxide cinder and a hot SO₂ gas stream carrying entrained solids, separation from the gas stream in the dry way of the bulk of entrained solids, and subjection of the gas to wet purification to effect separation of residual solids and other impurities, the improvement comprising treating the gas stream, after dry separation therefrom of the bulk of entrained solids, to effect separation from the gas stream of the major portion of said residual entrained solids, contacting the resulting gas stream in a packed concentrating chamber with a sulfuric acid solution, regulating the contacting operation so as to effect substantially complete removal of residual solids from the gas and so that the sulfuric acid containing liquid effluent of such contacting operation has concentration not less than 30 and not more than 41° Bé., introducing at least a portion of said liquid effluent into said suspension roasting zone, and dissociating said portion to form $SO_2$ by means of heat liberated on suspension roasting of further quantities of metal sulfide fines.

7. In the production and purification of $SO_2$ gas by an operation involving oxidation of metal sulfide fines in a suspension roasting zone with formation of metal oxide cinder and a hot $SO_2$ gas stream carrying entrained solids, separation from the gas stream of the bulk of entrained solids, and subjection of the gas to wet purification to effect separation of residual solids and other impurities, the improvement comprising scrubbing the gas stream with aqueous liquid in quantity and under conditions to cause separation from the gas stream of the major portion of solids entrained in the gas stream as subjected to said scrubbing, contacting the resulting gas stream with a sulfuric acid solution, regulating the contacting operation so as to effect substantially complete removal of residual solids from the gas and so that the sulfuric acid containing liquid effluent of such contacting operation has concentration not less than 30 and not more than 41° Bé., introducing at least a portion of said liquid effluent into said suspension roasting zone, and dissociating said portion to form $SO_2$ by means of heat liberated on suspension roasting of further quantities of metal sulfide fines.

URBAN S. LAUBER.